United States Patent
Harano

[19]

[11] Patent Number: 6,028,555

[45] Date of Patent: Feb. 22, 2000

[54] MOBILE COMMUNICATION ANTENNA DEVICE

[75] Inventor: Nobuya Harano, Shizuoka, Japan

[73] Assignee: NEC Corporation, Tokyo, Japan

[21] Appl. No.: 08/997,609

[22] Filed: Dec. 23, 1997

[30] Foreign Application Priority Data

Dec. 27, 1996 [JP] Japan ................................. 8-349657

[51] Int. Cl.⁷ .................................................. H01Q 1/24
[52] U.S. Cl. ......................................... 343/702; 343/725
[58] Field of Search .................................. 343/702, 725; 455/575, 89

[56] References Cited

U.S. PATENT DOCUMENTS 5,649,306  7/1997  Vannatta et al. ...................... 455/575

FOREIGN PATENT DOCUMENTS

| 62-232202 | 10/1987 | Japan | H01Q 1/50 |
| 2-70510 | 5/1990 | Japan | H01Q 1/24 |
| 4-103006 | 9/1992 | Japan | H01Q 1/38 |
| 7-273685 | 10/1995 | Japan | H04B 1/38 |
| 7-321688 | 12/1995 | Japan | H01Q 1/24 |
| 8-265026 | 10/1996 | Japan | H01Q 1/24 |

*Primary Examiner*—Don Wong
*Assistant Examiner*—Shih-Chao Chen
*Attorney, Agent, or Firm*—Young & Thompson

[57] ABSTRACT

A replaceable battery cover can be detachably mounted on a battery storage portion formed in the housing of mobile terminal equipment. A linear or plate-like antenna conductor having an antenna element pattern is joined to the inner surface of the battery cover by using one of joining means including embedding, boding, welding, and fitting means. The battery cover is mounted on the storage portion to electrically connect the antenna conductor to a radio circuit in the housing. In this case, by changing the arrangement of the antenna conductor, the antenna can be replaced with a loop antenna, a zigzag antenna, a helical antenna, or a microstrip antenna in accordance with a specific battery cover. In addition, the device may have an external antenna connection terminal to which an external antenna can be connected or an external interface section.

7 Claims, 6 Drawing Sheets

MOBILE COMMUNICATION ANTENNA DEVICE

BACKGROUND OF THE INVENTION

1. Field of the Invention

The present invention relates to a mobile communication antenna device and, more particularly, to a mobile communication antenna device mounted in compact mobile terminal equipment including portable radio calling units, transceivers, cordless telephones, portable telephones, portable information terminals, and the like.

2. Description of the Prior Art

Recently, mobile terminal equipment, in particular, has rapidly improved in performance and decreased in size. In contrast to this, since mobile communication antenna devices basically tend to have good characteristics with respect to wavelengths as they increase in size, the miniaturization of the devices is limited.

Provided that the size and function of an antenna remain the same, the band narrows as the gain increases, and vice versa. That is, the gain and the band tend to contradict each other. For this reason, as the size of an antenna is decreased, either or both of the gain and the band are sacrificed, resulting in a deterioration in characteristics. FIG. 1 is a graph showing the correlation between the antenna size and the antenna gain/band.

In consideration of such antenna characteristics, compact, high-performance antennas such as inverted F antennas, microstrip antennas, and whip antennas have been used for mobile terminal equipment. A loop antenna as a magnetic field type antenna, is used for a radio selective calling receiver, generally called a pager, to obtain a high gain while the unit is carried by the user in close proximity to his/her body.

As described above, to obtain good antenna characteristics, the antenna size is preferably increased. With the tendency toward a reduction in size of an equipment body, however, a sufficient space for an antenna is difficult to ensure.

For example, FIG. 2 shows a structure proposed to solve the problem associated with the space for an antenna. In this structure, a loop antenna 81 is mounted in an equipment housing 80 by using its inner wall side. Referring to FIG. 2, reference numeral 82 denotes a storage portion which is a recess portion in which a battery is to be mounted. In contrast to this, in the antenna device for the electronic device disclosed in Japanese Unexamined Utility Model Publication No. 2-70510, the antenna member is slidably mounted on the battery cover detachably mounted on the housing of the electronic device body.

In the conventional structure shown in FIG. 2, however, when the loop antenna 81 is mounted in the housing 80, it is basically difficult to completely prevent interference between the antenna and other electronic parts mounted in the housing. In the antenna device disclosed in Japanese Unexamined Utility Model Publication No. 2-70510, since antenna characteristics are uniquely determined by the structure in which the antenna slidably moves on the surface of the battery cover, it is difficult for the antenna device to cope with various types of electronic devices demanding various levels of performance. That is, it is structurally impossible to greatly improve the antenna characteristics of the electronic device for which this antenna device is used.

SUMMARY OF THE INVENTION

It is an object of the present invention to provide a mobile communication antenna device which can effectively ensure a mount space by using a battery storage cover in mobile terminal equipment which tends to be improved in performance and smaller in size.

In order to achieve the above object, according to the present invention, there is provided a mobile communication antenna device, wherein a replaceable battery cover can be detachably mounted on a battery storage portion formed in a housing of mobile terminal equipment, a linear or plate-like antenna conductor having an antenna element pattern is joined to an inner surface of the battery cover by using one of joining means including embedding, boding, welding, and fitting means, and the battery cover is mounted on the storage portion to electrically connect the antenna conductor to a radio circuit in the housing.

As described above, to cope with the tendency toward an improvement in performance and a reduction in size of compact mobile terminal equipment, the mobile communication antenna device of the present invention effectively uses a limited space by using the battery cover.

In the above mobile communication antenna device, the antenna conductor formed on the battery cover can be combined with an antenna conductor formed in the housing. In this case, the antenna conductor formed in the housing can be formed on a printed wiring board on which a radio circuit is formed in the housing. In addition, diversity reception can be performed between the antenna conductor on the battery cover side and the antenna conductor on the housing side.

In the above mobile communication antenna device, the following types of antennas can be formed. For example, a zigzag antenna can be formed by bending the antenna element pattern of the antenna conductor in a zigzag form, or a helical antenna can be formed by helically winding the antenna element pattern. In addition, a microstrip antenna can be formed by forming the antenna element pattern of the antenna conductor using a microstrip line. An antenna conductor formed from an upgraded microstrip line can be formed to have an area almost equal to that of the surface of the housing.

In the above mobile communication antenna device, the battery cover can have an external antenna connection terminal to which an external antenna can be connected. Similarly, the battery cover can have an external interface section for exchanging communication data with an external device.

As described above, according to the mobile communication antenna device of the present invention, since the antenna element formed into various types of antenna element patterns is mounted on the battery cover, a high-performance antenna can be mounted by effectively using a limited space in a compact, portable radio unit or the like. In addition, by replacing the battery cover, the antenna can be replaced with various types of antennas having various levels of antenna performance, or the antenna can be upgraded.

DETAILED DESCRIPTION OF THE PREFERRED EMBODIMENTS

Figure 3:
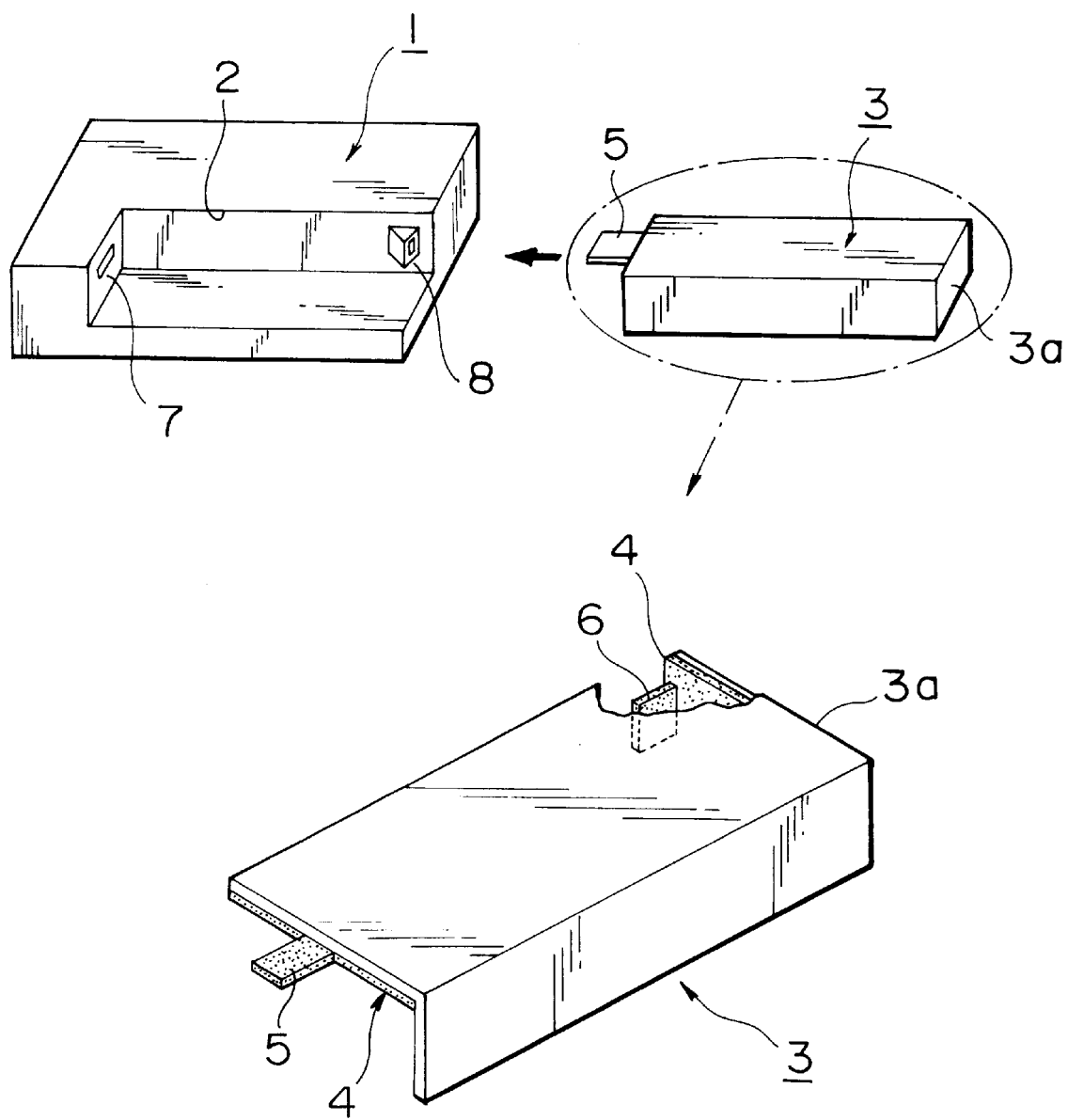
FIG. 3 is an exploded perspective view showing a portable radio unit to which a mobile communication antenna device using a battery cover according to the first embodiment of the present invention is applied.

The first embodiment of the present invention will be described first with reference to FIG. 3. As shown in FIG. 3, a recess portion serving as a storage portion 2 for storing a battery (not shown) is formed in a housing 1 of mobile terminal equipment such as a pager. The storage portion 2 is covered with a battery cover 3 after a battery is stored therein to protect the battery.

The battery cover 3 is made of a synthetic resin or the like and has, for example, an L-shaped cross-section. One end portion of the battery cover 3 in the longitudinal direction is closed with a side wall 3a. A plate-like antenna conductor 4 on which an antenna element pattern is formed is bonded to the inner surface of an upper side of the battery cover 3 with, for example, an adhesive. The antenna conductor 4 may be joined to the inner surface of the battery cover 3 by using any type of joining means, other than the bonding means, e.g., an embedding, welding, or fitting means. The antenna conductor 4 has a feed terminal 5 and a ground terminal 6. The antenna conductor 4 can be electrically connected to a radio circuit in the housing 1 (to be described below) through these two terminals.

The housing 1 incorporates various electronic parts including a radio circuit constituted by a printed wiring board and the like. A slit-like feed terminal connection port 7 and a projecting ground terminal connection port 8 are formed in the battery storage portion 2. The feed terminal 5 formed on the battery cover 3 can be inserted into the feed terminal connection port 7. The ground terminal 6 on the battery cover 3 side can be inserted into the ground terminal connection port 8. That is, when the feed terminal 5 of the battery cover 3 is inserted into the feed terminal connection port 7, the feed terminal 5 can be electrically connected to the antenna connection portion of the radio circuit in the housing 1.

In the first embodiment, another antenna conductor can be mounted in the housing 1, and can be combined with the antenna conductor 4 on the battery cover 3 side. In this arrangement, the feed terminal 5 and the ground terminal 6 on the battery cover 3 side are respectively inserted into the feed terminal connection port 7 and the ground terminal connection port 8 on the storage portion 2 side to be connected to the antenna conductor in the housing 1. In this case, diversity reception can be performed between the antenna conductor 4 on the battery cover 3 and the antenna conductor mounted in the housing 1.

In addition, the printed wiring board in the housing 1 can be used as a ground conductor plate (ground plate). In this case, the printed wiring board serves as a ground conductor plate, and the overall device serves as an antenna, thereby increasing the apparent size of the antenna with respect to wavelengths.

As for the direction of polarization, in consideration of the structure of the antenna conductor 4, the direction of a current flowing in the antenna including the printed wiring board can be controlled to a certain degree. As a result, desired antenna performance can be obtained.

Figure 1:
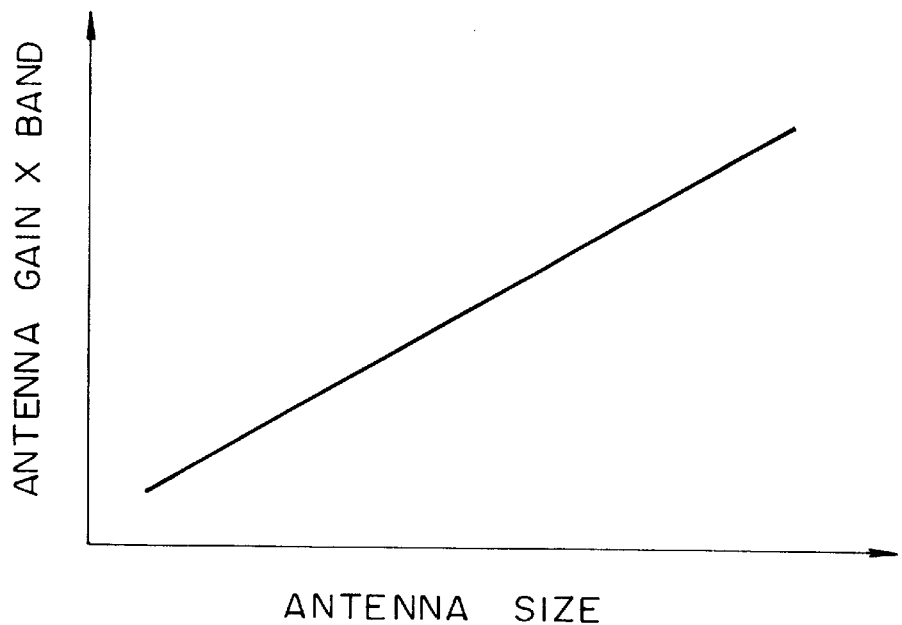
FIG. 1 is a graph showing antenna characteristics, and more specifically, the correlation between the antenna size and the antenna gain/band.
Figure 2:
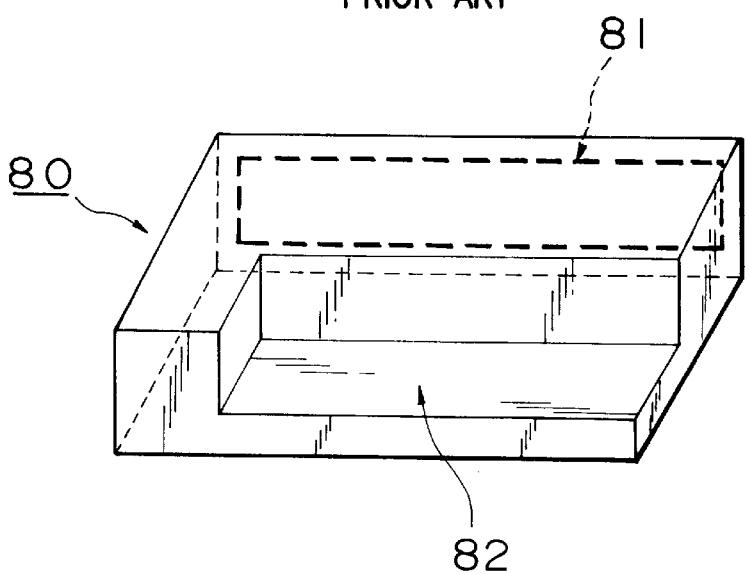
FIG. 2 is a perspective view showing a loop antenna mounted in an equipment housing body, which is disclosed in Japanese Unexamined Utility Model Publication No. 2-70510.
Figure 4:
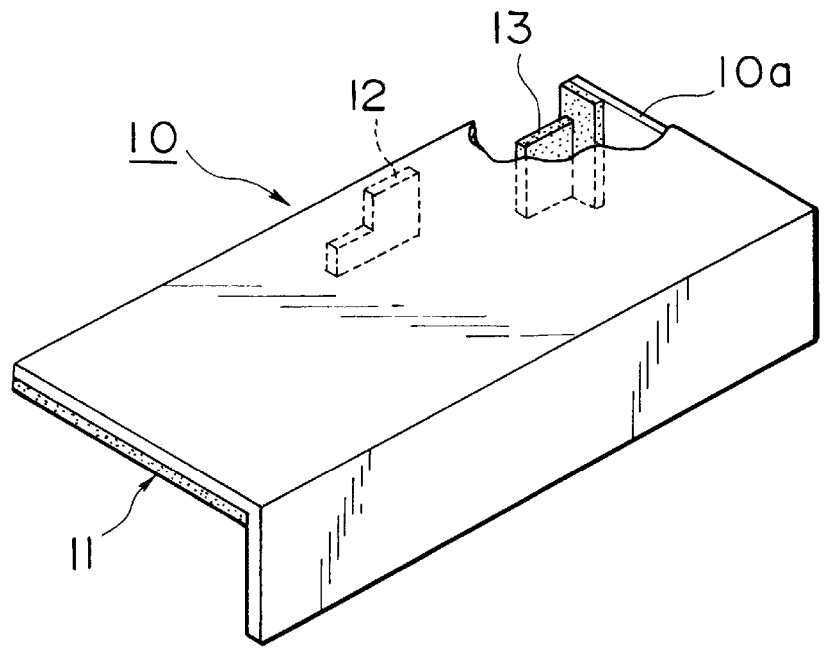
FIG. 4 is a perspective view showing a battery cover on which a plate-like inverted F antenna according to the second embodiment of the present invention is mounted.

The second embodiment of the present invention will be described next with reference to FIG. 4. FIG. 4 shows a battery cover 10 on which a plate-like inverted F antenna is mounted. In this case, the printed wiring board of the radio circuit in the housing 1 shown in FIG. 1 is used as a ground conductor plate. More specifically, a flat antenna conductor 11 is joined to the inner surface of the battery cover 10 having, for example, an L-shaped cross-section and a side wall 10a, and the antenna conductor 11 has a feed terminal 12 and a ground terminal 13. That is, the antenna conductor 11 is electrically connected to a radio circuit in the housing 1 through the feed terminal 12 and the ground terminal 13 so as to cause excitation between the antenna conductor 11 and the printed wiring board serving as the ground conductor plate, thereby operating the antenna conductor 11. In a device in which an electromagnetic shield is provided for a radio circuit, by using the electromagnetic shield portion as antenna ground, a high-performance antenna can be obtained.

Figure 5:
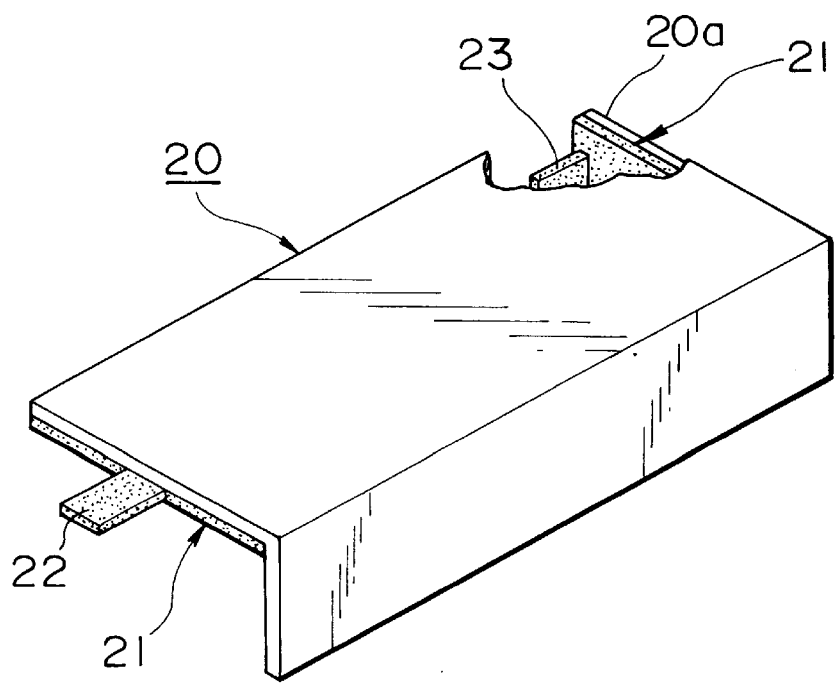
FIG. 5 is a perspective view showing a battery cover on which a plate-like loop antenna according to the third embodiment of the present invention is mounted.

The third embodiment of the present invention will be described next with reference to FIG. 5. FIG. 5 shows a battery cover 20 on which a plate-like loop antenna is mounted. As shown in FIG. 5, an antenna conductor 21 is joined to the inner surface of the battery cover 20 having, for example, an L-shaped cross-section and a side wall 20a on its one end. In this case, the antenna conductor 21 has radio circuit connection terminals 22 and 23. In a housing 1 (see FIG. 3), the printed wiring board of a radio circuit is used to form part of an antenna device on the board, or another antenna conductor is formed. The antenna conductor formed in the housing 1 is combined with the antenna conductor 21 on the battery cover 20 side to form a loop.

Figure 6:
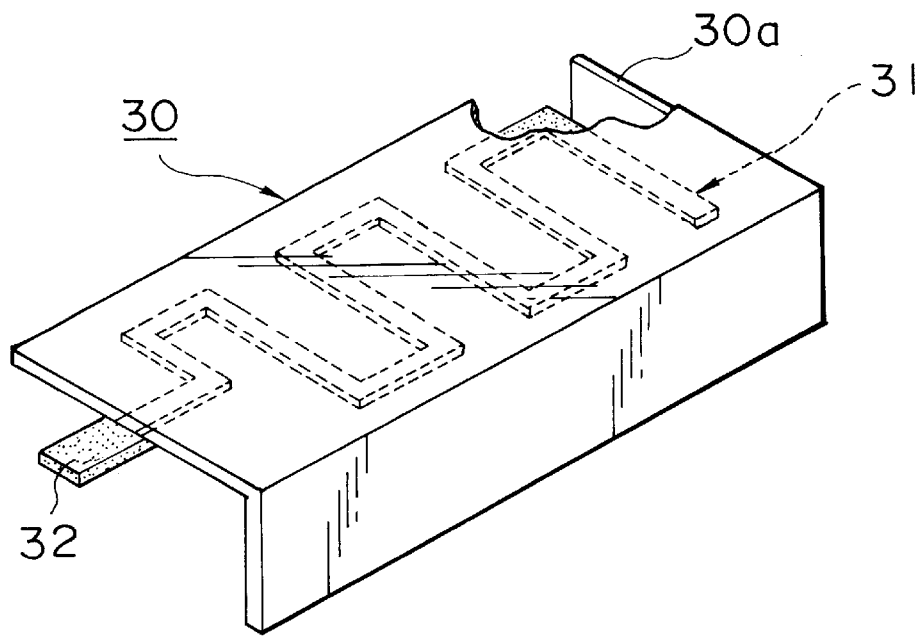
FIG. 6 is a perspective view showing a battery cover on which a zigzag antenna according to the fourth embodiment of the present invention is mounted.

The fourth embodiment of the present invention will be described next with reference to FIG. 6. FIG. 6 shows a battery cover 30 on which a zigzag antenna is formed. As shown in FIG. 6, an antenna conductor 31 obtained by bending a conductor in a zigzag form is mounted on the inner surface of the battery cover 30 having an L-shaped cross-section and a side wall 30a. The antenna conductor 31 is electrically connected to a radio circuit in a housing 1 (see FIG. 3) by inserting a feed terminal 32 formed on one end of the antenna conductor 31 into the housing 1. In this case, a winding helical conductor as a transmission helical antenna for UHF broadcasting can be used in place of the zigzag conductor.

Figure 7:
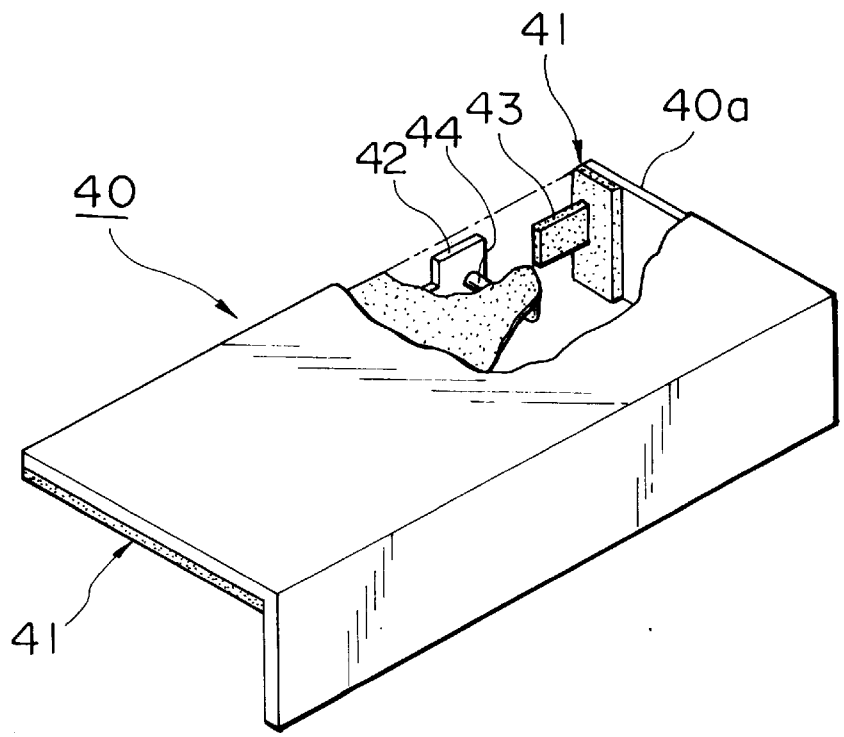
FIG. 7 is a perspective view showing a battery cover on which a microstrip antenna according to the fifth embodiment of the present invention is mounted.

The fifth embodiment of the present invention will be described next with reference to FIG. 7. FIG. 7 shows a battery cover 40 on which a microstrip antenna using a broadband microstrip line is mounted. In this case, a microstrip antenna conductor 41 is formed on the inner surface of the battery cover 40 having an L-shaped cross-section and on its one end 40a. The antenna conductor 41 is electrically connected to a radio circuit in a housing 1 through a feed terminal 42 and a ground terminal 43. A current is supplied from a conductor feed portion 44 to the antenna conductor 41.

Figure 8A:
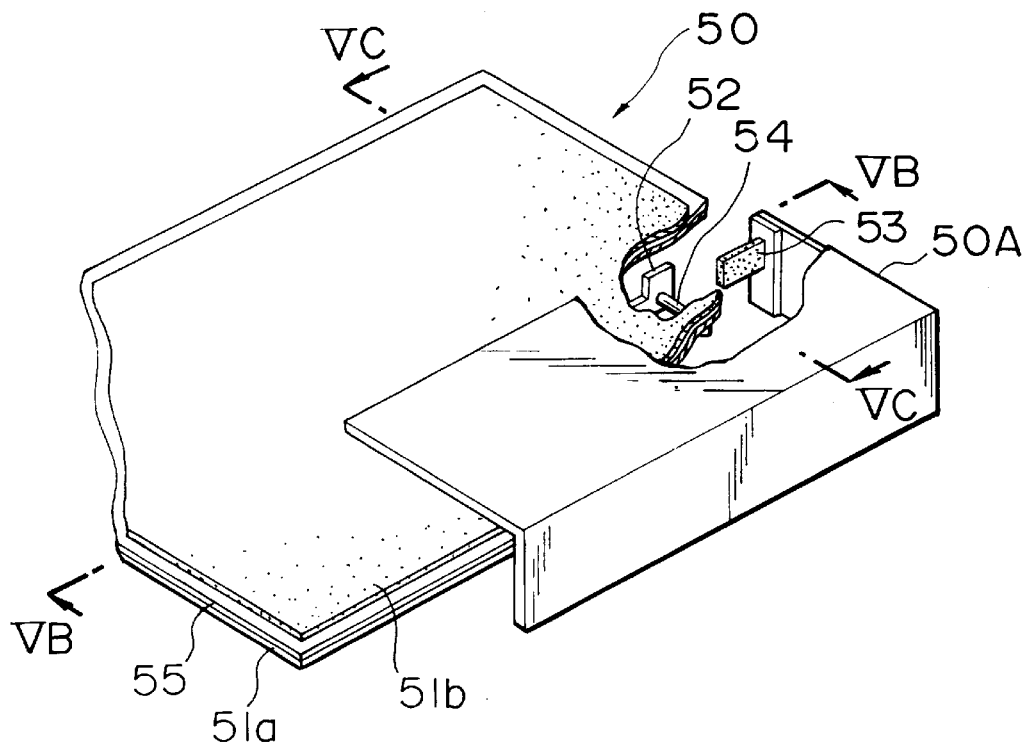
FIG. 8A is a perspective view showing a battery cover on which an upgraded microstrip antenna according to the sixth embodiment of the present invention is mounted.
Figure 8B:
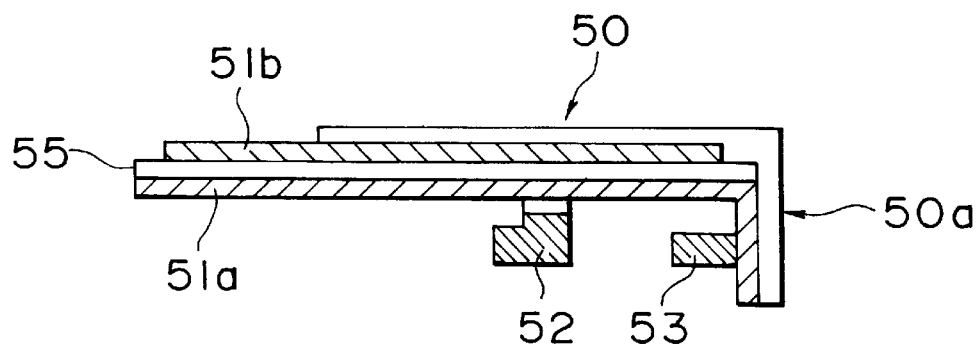
FIG. 8B is a sectional view taken on line VB—VB of FIG. 8A.
Figure 8C:
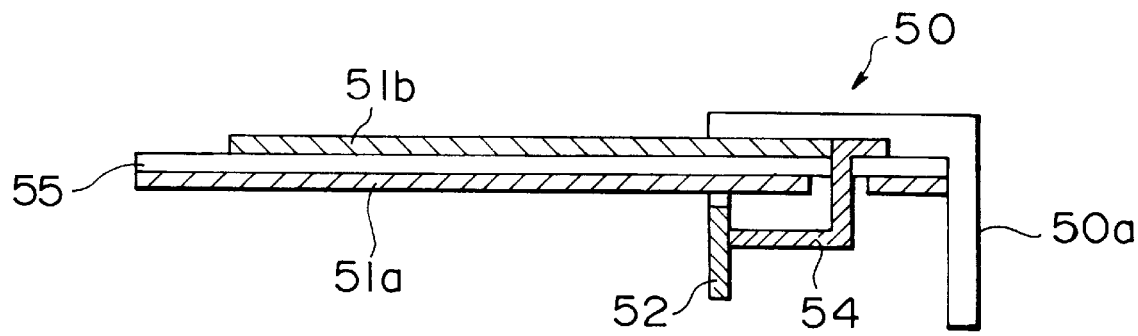
FIG. 8C is a sectional view taken on line VC—VC of FIG. 8A.

The sixth embodiment of the present invention will be described next with reference to FIGS. 8A, 8B and 8C. FIGS. 8A, 8B and 8C show a battery cover 50 having an L-shaped cross-section on which an upgraded microstrip antenna is mounted. In this case, microstrip antenna conductors 51a and 51b are larger than the surface of the battery cover 50 and is almost equal to the surface of a housing 1. With this structure, antenna performance with a higher gain is obtained while the portability of the device is maintained. The microstrip antenna conductors 51a and 51b are bonded with a printing substrate 55 between. The microstrip antenna conductor 51a is connected to a radio circuit in the housing 1 by a ground terminal 53 that may be mounted on the end 50a. In addition, a current is supplied from a conductor feed portion 54 to the microstrip antenna conductor 51b through a feed terminal 52.

Figure 9:
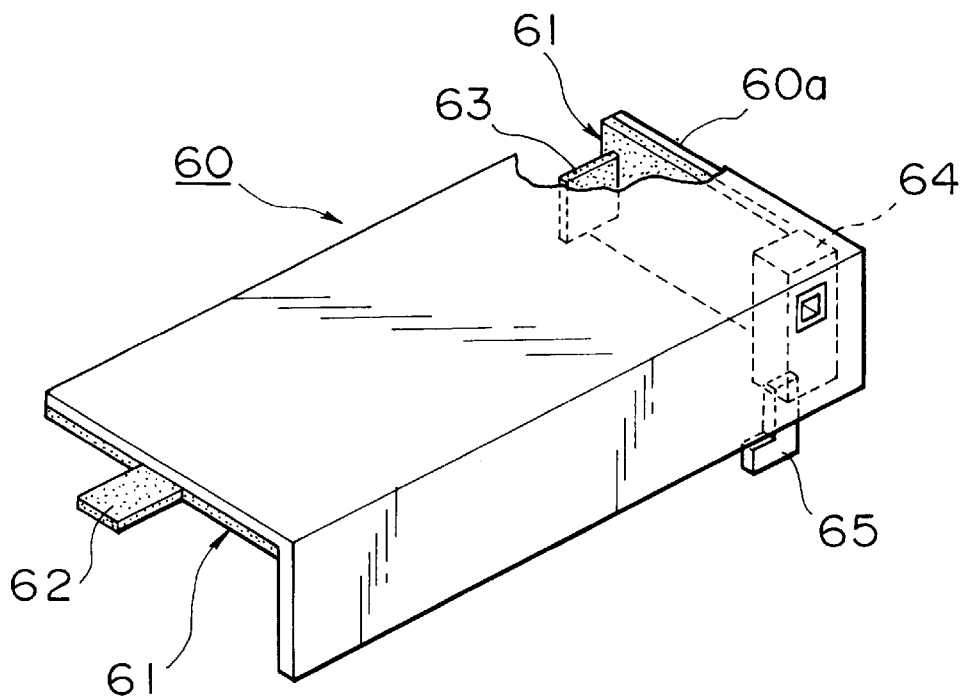
FIG. 9 is a perspective view showing a battery cover on which an antenna having an external antenna connector section according to the seventh embodiment of the present invention is mounted.

The seventh embodiment of the present invention will be described next with reference to FIG. 9. FIG. 9 shows a battery cover 60 on which a compact, plate-like loop antenna having an external antenna terminal is mounted. In this case as well, an antenna conductor 61 is formed on the inner surface of the battery cover 60 having an L-shaped cross-section and a side wall 60a on its one end. The antenna conductor 61 has radio circuit connection terminals 62 and 63 and an external antenna connector section 64 for allowing an external antenna (not shown) to be mounted. In this case, the external antenna is mounted on the antenna conductor 61 to attain a further improvement in sensitivity. The external antenna connector section 64 is electrically connected to a radio circuit in the housing 1 through an external antenna connection terminal 65.

Figure 10:
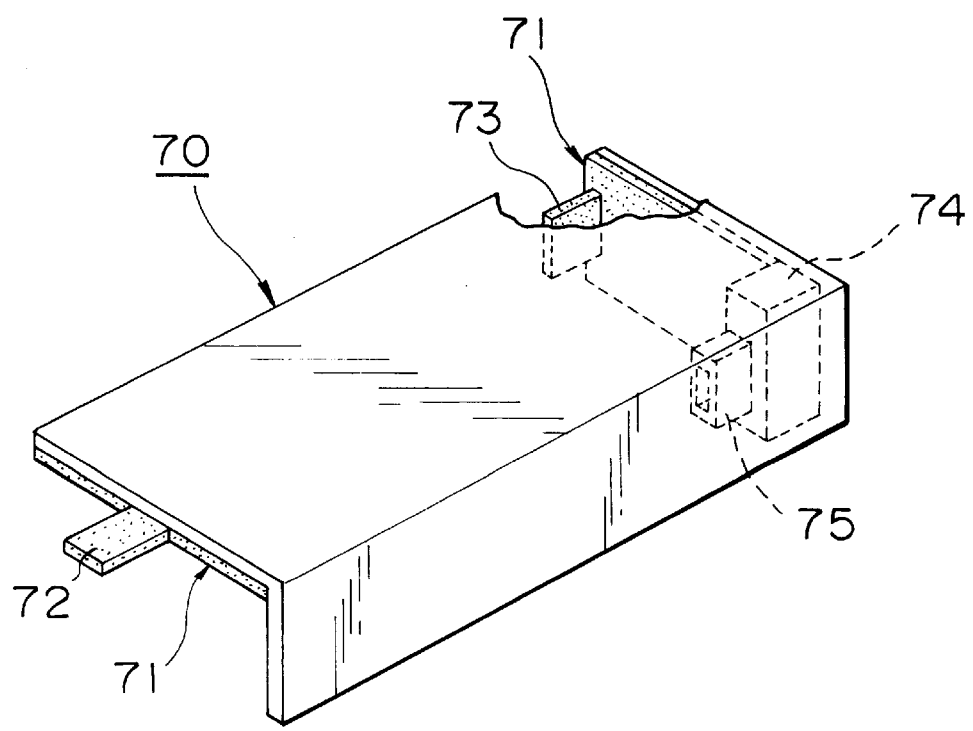
FIG. 10 is a perspective view showing a battery cover on which an antenna having an external interface section according to the eighth embodiment of the present invention is mounted.

The eighth embodiment of the present invention will be described next with reference to FIG. 10. FIG. 10 shows a battery cover 70 on which a compact, plate-like loop antenna having an external interface is mounted. In this case as well, an antenna conductor 71 formed on the battery cover 70 having an L-shaped cross-section and a side wall has radio circuit connection terminals 72 and 73. An external interface section 74 for exchanging communication data with an external device is formed on the battery cover 70 side. The external interface section 74 is electrically connected to a radio circuit in a housing 1 through a data connector section 75 on the housing 1 side. By changing the shape of the interface section, an infrared interface, a card slot interface, or the like can be mounted.

What we claim is:

1. An antenna for a mobile communication device having a battery compartment, comprising:

a selectively removable cover for the battery compartment of the mobile communication device, said cover having a flat back portion and an end portion generally orthogonal to said back portion;

an antenna conductor on an interior surface of said removable cover and comprising a first plate attached to said back portion, a substrate attached to a surface of said first plate opposite said back portion, a second plate attached to a surface of said substrate opposite said first plate, and a third plate attached to said end portion, said second plate being in electrical contact with said third plate;

a feed terminal extending from said first plate; and a ground terminal extending from one of said second and third plates, wherein said feed and ground terminals are arranged and constructed to electrically connect said antenna conductor to the mobile communication device.

2. The antenna of claim 1, further comprising a further antenna conductor in a housing for the mobile communication device.

3. A device according to claim 2, wherein said further antenna conductor in said housing is on a printed wiring board in said housing.

4. A device according to claim 2, wherein said antenna conductor and said further antenna conductor are arranged and constructed for performing diversity reception between said antenna conductor on said battery cover and said further antenna conductor in said housing.

5. The device according to claim 1, wherein said cover comprises an external antenna connection terminal adapted to receive a connection for an external antenna.

6. The device according to claim 1, wherein said cover has an external interface section for exchanging communication data with an external device.

7. The antenna of claim 1, wherein each of said first and second plates and said substrate has a larger areal extent than said back portion.

* * * * *